United States Patent [19]

Fowler

[11] Patent Number: 5,644,077
[45] Date of Patent: Jul. 1, 1997

[54] WAVE-POWERED OCEAN PROFILER

[75] Inventor: George A. Fowler, Dartmouth, Canada

[73] Assignee: Her Majesty the Queen in right of Canada, as represented by the Minister of Fisheries of Oceans, Ottawa, Canada

[21] Appl. No.: 544,171

[22] Filed: Oct. 17, 1995

[51] Int. Cl.⁶ .................................................. G01W 1/00
[52] U.S. Cl. ................................. 73/170.29; 73/170.31
[58] Field of Search .......................... 73/170.29, 170.31, 73/170.34, 863, 864.33, 864.31, 866.5, 864.65, 864.66, 864.67

[56] References Cited

U.S. PATENT DOCUMENTS 3,590,635 7/1971 Duing ........................................ 73/170
3,927,562 12/1975 Hickey ...................................... 73/170
3,935,592 1/1976 Dahlen et al. ........................ 73/170.29
4,215,572 8/1980 Spiess .................................. 73/170.34

Primary Examiner—Richard Chilcot
Assistant Examiner—Ronald Biegel
Attorney, Agent, or Firm—Ronald G. Biner

[57] ABSTRACT

An ocean profiler that utilizes ocean wave energy to provide power for repeated ascent and descent of an oceanographic instrument. In one embodiment the instrument assembly is provided with either positive or negative buoyancy such that the instrument can traverse one half of the travel cycle rapidly utilizing the buoyancy force. Utilizing wave power for instrument traversing greatly reduces the power requirement of the apparatus allowing extended unattended operation.

9 Claims, 4 Drawing Sheets

WAVE-POWERED OCEAN PROFILER

FIELD OF THE INVENTION

This invention relates to a wave-powered apparatus for collecting oceanographic profile data.

BACKGROUND OF THE INVENTION

Time series profiles of salinity and temperature of the upper layers of the ocean are useful for the study of various ocean conditions such as the variation of ocean currents. Various types of oceanographic profilers have been used or proposed to measure ocean parameters at different depths.

A number of prior profilers involve moving the sensing instrument up and down along a moored line. Many of these prior devices operate by changing the buoyancy for each cycle of operation. An example of such a device is disclosed it, U.S. Pat. No. 3,927,562 which uses a plurality of gas generators wherein one gas generator is utilized to vary buoyancy for each cycle of ascent and descent.

One of the difficulties with present profilers is that considerable stored energy, in the profiler is required to repeatedly change buoyancy, or otherwise raise and lower the instrument, over many cycles of operation.

For the ocean current variation studies referred to above, it would be desirable to have a high resolution oceanographic profiler that can operate unattended for long periods of time, such as two years or longer, and be capable of daily operation to a depth of 2,000 m.

SUMMARY OF THE INVENTION

An object of the present invention is to provide an apparatus for collecting oceanographic profile data that requires little stored energy and can be used to operate unattended for relatively long periods of time.

It has been found that oceanographic profile data can be obtained by a device that utilizes wave energy to convey the profiler instrument up and down.

The present invention provides a wave-powered ocean profiler, comprising: an instrument for collecting oceanographic profile data; a buoyant member for riding the waves on a body of water; a line suspended from a lower end of the buoyant member; a line traversing assembly operatively disposed on the line for supporting the instrument and conveying the instrument along the line; said traversing assembly including a disengagable one-way clutch, operative, while engaged, to allow travel incrementally along the line in one direction as the line rises and falls under the action of waves, and to prevent travel along the line in the opposite direction: and actuating means for the one-way clutch, responsive to a condition representative of a desired travel limit of the traversing assembly along the line, and operative for selectively engaging or disengaging the one way clutch.

DESCRIPTION OF THE PREFERRED EMBODIMENTS

Figure 1:
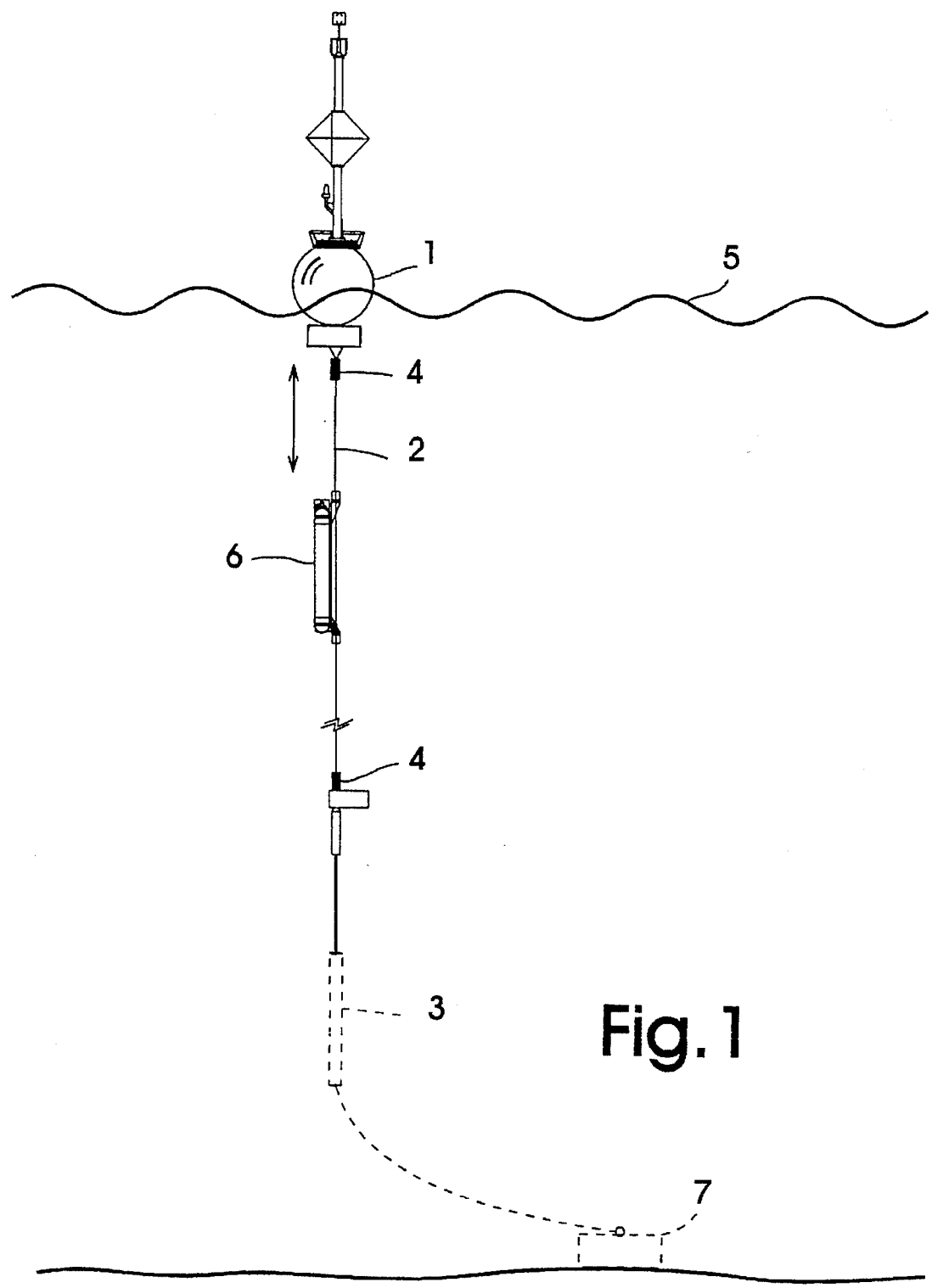
FIG. 1 is a schematic representation of the oceanographic profiler of the present invention.

With reference to FIG. 1, the present invention comprises a buoyant member 1 having suspended therefrom a line 2. Operatively associated with the line is a line traversing assembly 6 for conveying instrument components for the acquisition and transmission of profile data.

Figure 2:
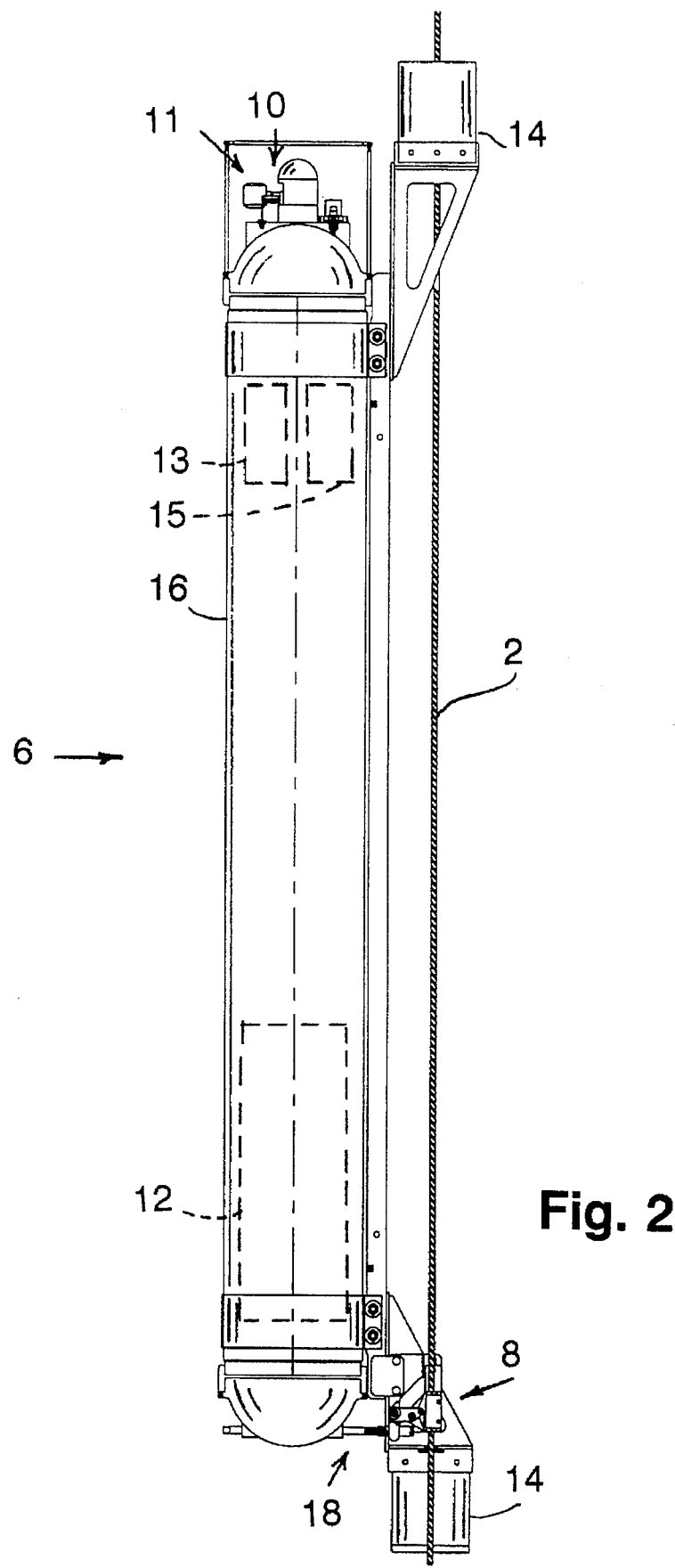
FIG. 2 is an enlarged view of the instrument assembly shown in FIG. 1.

With reference to FIG. 2, the profile instrument components 10 include profile data sensing and recording means 11, battery 12, and electronic components 13 for data processing and transmission and may include a computer 15 for system control.

As illustrated in FIG. 2, the traversing assembly 6 comprises a sealed enclosure 16 that encloses a number of the system components. In the preferred embodiment of the invention, the enclosure 16 is designed such that the line traversing assembly 6 has a specific gravity different from that of the water to provide either positive or negative buoyancy. For example, positive buoyancy can be achieved by a sealed enclosure 16 containing air or gas.

Figure 3:
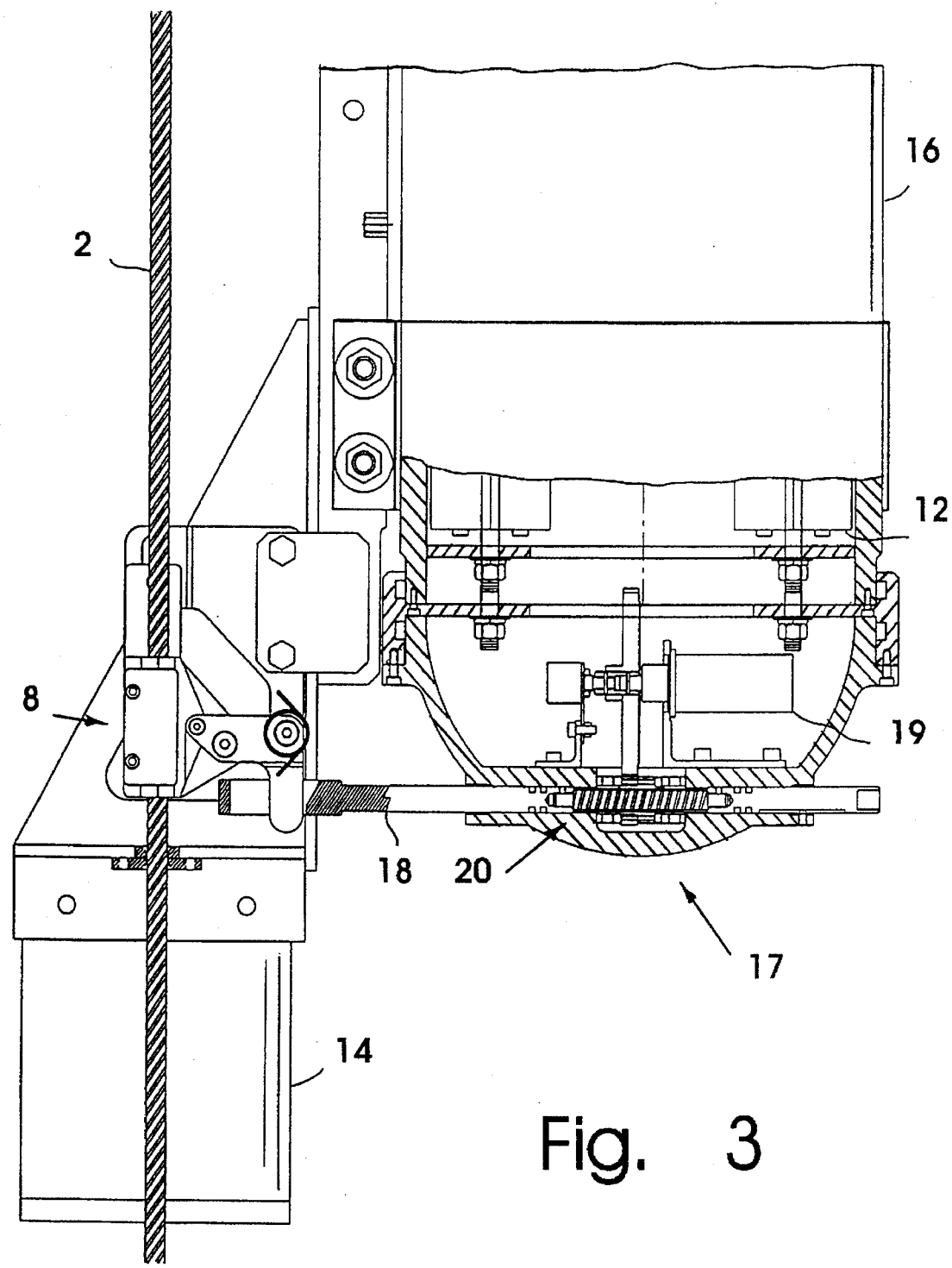
FIG. 3 is an enlarged view of a portion of the instrument assembly illustrating details of one embodiment of the one-way clutch and clutch actuating mechanism.

In the embodiment illustrated in FIGS. 1 to 3, the instrument traversing assembly 6 has a single disengagable one-way clutch 8, operative, while engaged, to allow travel incrementally along the line 2 in a direction against the buoyancy force of the assembly as the buoyant member 1 and line 2 rises and falls under the action of waves, and prevents travel along the line in the opposite direction. In this embodiment the buoyancy force is utilized to return the assembly 6 to the original position, by disengaging the clutch from the line 2.

Figure 4A:
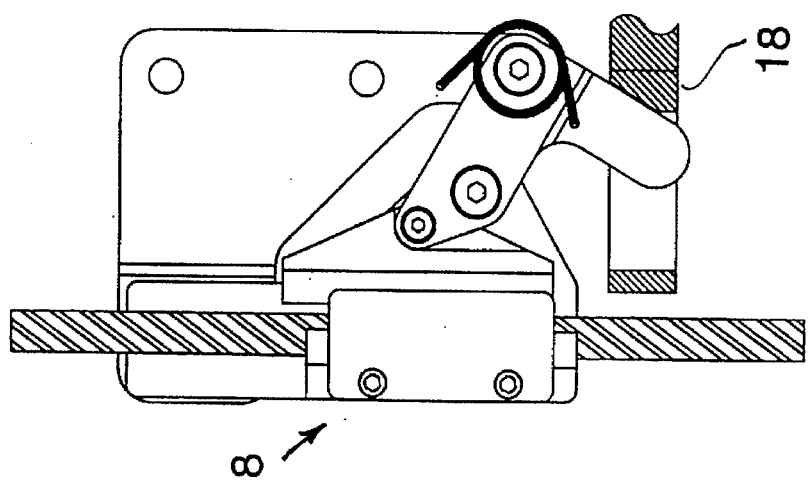
FIGS. 4(a), (b), and (c) show the one-way clutch of FIG. 3 in the engaged position, disengaged position, and locked position, respectively.

As best seen in FIG. 3 and 4, the one-way clutch 8 is selectively engaged or disengaged by actuator 17 by means of arm 18. When disengaged, the assembly moves freely in the direction of the buoyancy force. FIGS. 4(a), (b), and (c) show the one-way clutch of FIG. 3 in the engaged position, disengaged position, and locked position respectively.

FIG. 3 shows details of one embodiment of an actuator mechanism 17 which includes an arm 18, drive motor 19 and interconnecting motion translating mechanism 20. It will be understood that other forms of mechanisms could be used.

Activation of the one-way clutch by actuator 17 may be made responsive to a condition representative of a desired travel position of the traversing assembly 6 along the line, with the use of suitable control means. The control means may, for example, include a marker, or markers, on the line representing travel limits, and a suitable marker sensor, or the control means may be made responsive to the position by suitable depth sensing means. The control means may include a suitable computer 15. Alternatively, activation of the one-way clutch may be activated entirely, or partly, by mechanical means, for example with the use of stoppers 4, defining upper and lower travel limits.

The component referred to as a "one-way clutch" herein, may take any of various forms which allows the instrument assembly 6 to travel along the line in one direction only, when engaged, and to allow free travel when disengaged. A device found to be suitable is known as a "Chicago Clamp" which has been used at sea for many years. Other devices could be used, such as a collet.

The one-way clutches could be controlled mechanically, for example, with the use of upper and lower mechanical stoppers which could provide that the instrument assembly cycles continuously between the stoppers. For greater flexibility the one-way clutches are preferably controlled by a computer 15 which facilitates greater flexibility in cycle timing and/or for transfer of data.

Since there is the possibility of wear occurring where the clutch locks repeatedly onto the line, it may be desirable to introduce a "dither" command into the locking cycle.

The assembly 6 is shown provided with bumpers 14 which are adapted to contact with stoppers or bumpers 4 disposed at the upper and lower travel limits of the line 2, as shown in FIG. 1.

Preferably the line 2 will be provided with some form of tightening means to provide that the line is taut and moves up and down with the buoyant member 1, as it rides up and down with the waves 5. This can be achieved by the use of suitable ballast 3, as shown in FIG. 1, or may be achieved by the use of sufficient mass of the line 2, itself. Alternatively, an elastic member my be interconnected between the lower end of the line 2 and the ocean bottom.

The system may be anchored in the desired location with a suitable anchor 7 shown attached to the ballast 3, or be allowed to drift freely.

The buoyant member may be made up of a group of interconnected buoys, rather than a single unit as illustrated. Such an arrangement can be advantageous for attentuating motion of the line, and hence the traversing assembly, in heavy weather. Protection in heavy weather for the traversing assembly and/or instruments can also be obtained by incorporating suitable suspension and/or damping means.

Figure 4B:
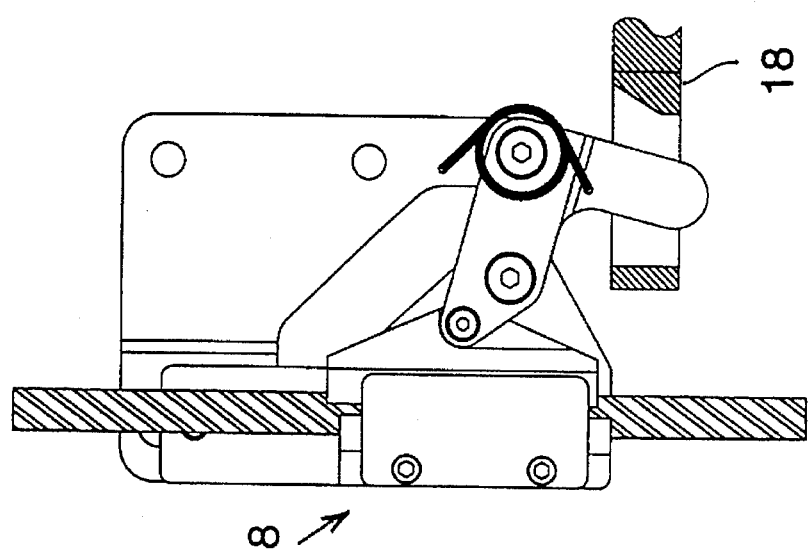

In operation, the action of ocean waves moves the buoyant member 1 up and down. The line 2 which is attached to the buoyant member 1, also moves up and down, along with any attached ballast 3. The instrument assembly 6 is attached to the line 2 by means of a one-way clutch 8. With the one-way clutch engaged, by actuator 18, as shown in FIG. 4(b), the assembly is pulled along with the line as it moves in one direction, while allowing the line to slide relative to the instrument assembly 6 in the opposite direction. With repeated up and down motion of the line, the instrument will advance incrementally in one direction determined by the selected orientation of the one-way clutch 8.

Figure 4C:
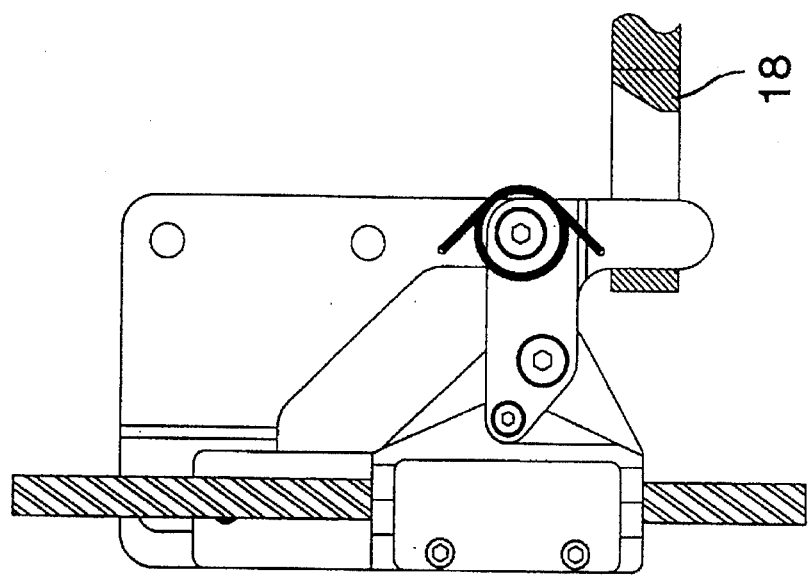

For return to the original position, the one-way clutch is disengaged from the line as shown in FIG. 4(b), returning for example, by utilizing the buoyancy force of the traversing assembly. When no advancing motion of the assembly is desired, such as when transmitting data, the one-way clutch can be locked as shown in FIG. 4(c).

Profile data can be recorded by the instrument during descent, ascent, or both directions. In an embodiment that utilizes buoyancy for ascent, data acquisition during the ascent may be preferably for a number of reasons. With a suitable buoyancy force, the instrument can be made to rise rapidly so that power to the sensors and data logger need be supplied for a shorter time. Furthermore, the ascent will be smoother and more consistent. Also, transmission of data to the surface buoy can be achieved with a less powerful transmitter.

Data recorded by the instrument can be collected and/or transmitted by known telemetering techniques. For example, an acoustic communications system can be used to transfer data to the surface buoyant member from which it can be transmitted elsewhere via satellite.

For proper operation the instrument assembly must be provided with sufficient inertia and/or hydrodynamic drag to ensure that the traversing assembly does not follow the line in both directions of the up-down cycle of the line. The hydrodynamic drag of any ballast used should be as low as possible so that it and the line moves in concert with the buoyant member.

In the embodiment illustrated, utilizing one one-way clutch, when the assembly reaches a predetermined position the one-way clutch is disengaged by actuator 18 (see FIG. 4(b) so that the instrument assembly is free to travel in the direction determined by its buoyancy. In another embodiment, wherein two one-way clutches are employed, the actuator arm 18 reverses the engagement or disengagement status of each clutch.

As indicated above, the instrument assembly can have either positive or negative buoyancy. In the former case, the action of the waves is used to drive the assembly downward while the buoyancy force can be utilized to bring the assembly up to the upper position. In the later case, the action of the waves is used to drive the assembly upward while the negative buoyancy force can be utilized to bring the assembly down to the lower position.

In another embodiment of the invention, in which the traversing assembly 6 has substantially neutral buoyancy, the assembly employs two one-way clutches. In this embodiment one clutch would be engaged while the other is disengaged for each direction of travel, and both clutches would be reversed for the opposite direction of travel.

Since the power for raising and lowering the instrument is provided by wave energy, the present profiler can be made to operate unattended for relatively long periods of time. Still longer operation can be obtained by utilizing ocean wave, current, wind or solar energy for charging a battery for the electronic components used for data acquisition and transmission and system control.

EXAMPLE

A prototype similar to that illustrated in the drawings was constructed and tested. The device was provided with a single one-way clutch to drive the instrument assembly downward under the action of waves, and used positive buoyancy to return the instrument to the surface. The instrument assembly was 2.24 m long, 0.26 m in diameter, had a mass of 100 kg, and a positive buoyancy of 2.27 kg. The tests were run on a buoy/mooring which was forced at 0.43 hz with peak to peak amplitude of 0.24 m by the waves. These values were determined by doing a spectral analysis of the data obtained by a motion sensing instrument attached to the buoy. The waves produced a descent speed of about 12 to 14 m/min. The ascent speed, under the buoyancy force with one-way clutch disengaged, was 30 m/min.

What is claimed is:

1. A wave-powered ocean profiler, comprising:

a) an instrument for collecting oceanographic profile data;

b) a buoyant member for riding the waves on a body of water;

c) a line suspended from a lower end of the buoyant member:

d) a line traversing assembly operatively disposed on the line for supporting the instrument and conveying the instrument along the line; said traversing assembly including a disengagable one-way clutch, operative, while engaged, to allow travel incrementally along the line in one direction as the line rises and falls under the action of waves, and to prevent travel along the line in the opposite direction; and e) actuating means for the one-way clutch, responsive to a condition representative of a desired travel limit of the traversing assembly along the line, and operative for selectively engaging or disengaging the one way clutch.

2. The apparatus of claim 1 wherein the traversing assembly includes an enclosure having a specific gravity different from that of the body of water to provide a force urging the assembly for travel along the line, while the one-way clutch is disengaged, in a direction opposite to that provided by the action of waves while the one-way clutch is engaged.

3. The apparatus of claim 1 further comprising a second one-way clutch which is actuated opposite to that of the other one-way clutch, upon reaching a predetermined travel position for travel in the opposite direction.

4. The apparatus of claim 1 further comprising line tightening means to provide that the line is taut and moves up and down with the buoyant member.

5. The apparatus of claim 4 wherein the line tightening means comprises ballast means attached to a lower end of the line.

6. The apparatus of claim 4 wherein the line tightening means comprises an elastic member interconnecting a lower end of the line and the ocean bottom.

7. The apparatus of claim 1 further comprising anchoring means connected at a lower end of said line to restrict horizontal travel of the buoyant member while allowing the buoyant member, line to ride up and down with the action of waves.

8. The apparatus of claim 1 further comprising telemetering means for transmitting data from the instrument.

9. The apparatus of claim 1 further comprising control means for control of the actuating means.

* * * * *